United States Patent Office 3,516,907
Patented June 23, 1970

3,516,907
METHOD FOR PRODUCING
5'-MONONUCLEOTIDES
Heinrich Kirchhoff, Mannheim-Almenhof, Gerhard Pfleiderer, Frankfurt am Main, and Kurt Holle, Mannheim-Waldhof, Germany, assignors to Zellstoffabrik Waldhof, Mannheim-Waldhof, Germany
No Drawing. Filed Jan. 31, 1962, Ser. No. 170,257
Claims priority, application Germany, Feb. 4, 1961,
Z 8,532
Int. Cl. C12d 13/06
U.S. Cl. 195—28                                19 Claims

ABSTRACT OF THE DISCLOSURE

5'-mononucleotides produced by reacting nucleic acid with a 5'-phosphodiesterase extracted from a fruit, plant leaf, tuber, plant root or beet.

---

The importance of the ribose-5-phosphates of purine and of pyrimidine bases for biochemical research and in pharmaceutical chemistry is continuously increasing, particularly in view of the pivotal importance of these compounds with respect to metabolic activities. The methods which were available up to now for producing these compounds are not fully satisfactory. Chemical synthesis still requires involved and expensive multi-step reactions, and biosynthesis from the corresponding bases and ribose-1-phosphate or the ribosides (nucleosides) presupposes the recovery or preparation of pure starting products from biological materials and thus this method too is involved and requires considerable manufacturing effort and expense.

Chemical decomposition of nucleic acids does not render the desired 5'-mononucleotides, but only a mixture of 2'- and 3'-mononucleotides. The enzymatic decomposition of nucleic acids with the conventional depolymerases also will lead only to 2'- and 3'-mononucleotides.

It has been proposed to split nucleic acids enzymatically to mononucleotides. Apart from certain microorganisms, primarily snake venoums were suggested as suitable enzyme-containing substances. However, the working-up of the snake venoms so as to obtain the desired end product is difficult, time-consuming and requires careful maintenance of strictly controlled processing conditions. Furthermore, the raw material, i.e. the snake venom is difficult and dangerous to obtatin and expensive.

It is therefore an object of the present invention to provide a method of obtaining 5'-mononucleotides which is not subject to the above discussed difficulties and disadvantages.

It is another object of the present invention to provide a method of obtaining 5'-mononucleotides which may be carried out in a simple and economical manner.

It is yet another object of the present invention to provide a method of obtaining 5'-mononucleotides which requires only readily available and relatively inexpensive starting materials.

Other objects and advantages of the present invention will become apparent from a further reading of the description and of the appended claims.

With the above and other objects in view, the present invention is concerned with a method of obtaining 5'-mononucleotides, comprising the steps of reacting nucleic acid with an aqueous extract of vegetable material containing a 5'-phosphodiesterase active agent so as to decompose the nucleic acid under formation of 5'-mononucleotides, and recovering the thus formed 5'-mononucleotides.

According to a preferred embodiment, the present invention contemplates a method of obtaining 5'-mononucleotides, comprising the steps of forming at substantially ambient temperature an aqueous 5'-phosphodiesterase active extract of vegetable material, heating the thus formed extract for between about fifteen and twenty-five minutes in the presence of a heavy metal salt selected from the group consisting of the chlorides, sulfaes and nitrates of zinc, nickel and copper to a temperature of between about 55 and 65° C., cooling the extract to substantially ambient temperature, reacting a nucleic acid-containing material with the aqueous extract so as to decompose, due to the 5'-phosphorus-activity of the extract the nucleic acid under formation of 5'-mononucleotides, and recovering the thus formed 5'-mononucleotides.

According to the present invention it is possible to obtain the 5'-mononucleotides in a simple and economical manner by carrying out the enzymatic decomposition of nucleic acids with phosphodiesterase-active aqueous extracts of vegetable material, preferably in the presence of organic solvents, and to separate the thus formed 5'-mononucleotides from the reaction mixture.

It is possible to proceed in this manner because it has been found that vegetable materials derived from a great variety of plants or plant portions contain phosphodiesterase, and that it is possible by leaching with water, with or without the presence of organic solvents, to obtain from vebetable materials an active enzyme extract for the purpose of producing 5'-mononucleotides from nucleic acid-containing material.

It is preferred to use those plants or plant portions which grow quickly and/or which are rich of phosphodiesterase. Lignified plant portions and those having finished their growth, besides seeds and tubers, are less suitable. Especially suitable are young growing plant portions because older plants may contain enzymes producing 3'-mononucleotides.

Organic solvents in an amount of 5–20%, preferably 10%, corresponding to the water solution effect precipitation of undesired enzymes.

Vegetable materials which may be used in accordance with the preesnt invention for extracting therefrom an active enzyme extract, comprise primarily plants, the above-ground, as well as the subterranean parts thereof, such as fruits, seeds, tubers, roots and/or beets, as well as plant germs and sprouts or mixtures of different plants and plant parts with or without germs and sprouts.

Particularly good results according to the present invention are obtained with the crude extracts of seeds, germs, sprouts and parts thereof which are derived from di-cotyledones or mono-cotyledones, i.e. angiospermal plants, such as leguminous plants, wheat, rice, barley and/or grasses, as well as with the sprouts accruing in the production of malt.

It is also within the scope of the present invention to use for the decomposition of nucleic acids in place of the crude vegetable extracts, such extracts which were at least partially purified. For instance, the crude extracts may be purified by calcium phosphate-gel fractionation, or by precipitation with acetone or alcohol.

While it is possible to use the crude enzyme extract, it is generally preferred to enrich the enzyme concentration by the simple purification steps. For instance, the enzyme may be absorbed by a calcium phosphate-gel which is added to the clear solution, then, after centrifuging, eluated with ammonium sulfate and phosphate buffer solution, and from such solution precipitates with methanol, ethanol, acetone or similar organic solvents. Any 5'-nucleotidase, an enzyme which would split phosphoric acid from the 5'-mononucleotides, which is still present is then removed by subsequent chromatographic separation.

The enzyme extract is then added to a solution or suspension which contains nucleic acid, in order to obtain therefrom the mononucleotides, and the thus formed mononucleotides are preferably precipitated as alkaline earth metal salts. Preceding purification of the nucleic acids is not required according to the present invention. To the contrary, for instance, simple yeast extracts may be used as the nucleic acid-containing material.

The thus obtained reaction product is a mixture of the nucleotides of adenine, guanine, uridine and cytosine. The individual nucleotides may be separated by means of anion exchanges.

It is also possible according to the method of the present invention to obtain in the manner described above the desoxyribonucleotides of adenine, guanine, cytosine and thymine, provided that the starting material which is enzymatically reacted according to the present invention contains desoxyribonucleinic acids or desoxyribonucleic acid-containing material.

According to a preferred embodiment of the present invention the vegetable extracts which are to be used for the enzymatic decomposition of nucleic acids to 5'-mononucleotides first will be heat treated for relatively short periods of time, most preferably in the presence of heavy metal salts.

According to the above-described preferred manner of carrying out the method of the present invention, the extracts of vegetable material which contaian heterogenous compounds and to which organic solvents may have been added which are insoluble or only difficulty soluble in water, such as toluene, ethyl, acetate and/or chloroform (in an amount of 0.5–3%, preferably 1.5%, according to the volume of the solution), are heated prior to use of such extracts for splitting nucleic acids, for a short period of time, such as between about 5 and 40 minutes, preferably between 15 and 25 minutes at a temperature of between about 45 and 70° C., preferably between 55 and 65° C. The water immiscible solvents such as toluene are added in order to prevent undesirable infections of the extract. It is particularly advantageous to introduce into the extract prior to the above-described heating of the same, inorganic salts such as the chlorides, sulfates, nitrates or acetates of metals such as zinc, iron, manganese, nickel, cobalt and copper. The concentration of the heavy metal salts in the extracts are preferably limited to between $10^{-2}$ and $10^{-5}$ molar concentrations.

The scale of action of some heavy metal salts is stated subsequently:

|  | Minimum | Preferred sphere | Maximum |
|---|---|---|---|
| $ZnCl_2$, $FeCl_2$, $FeSO_4$, $ZnSO_4$ | 0.001 | 0.012 | 0.12 |
| $CuCl_2$, $Cu(NO_3)_2$, $Cu(CH_3COO)_2$ | 0.0008 | 0.0015 | 0.0020 |
| $NiCl_2$, $CoCl_2$, $NiSO_4$ | 0.0007 | 0.0013 | 0.002 |
| $MnCl_2$, $Mn(NO_3)_2$ | 0.002 | 0.03 | 0.1 |

Surprisingly it has been found that in accordance with the present method, the pH value may vary within wide limits whereby, of course, extreme acid or alkaline ranges are to be avoided. In order to obtain substantial inactivation of the 5'-mononucleotidase, it has been found advantageous to adjust the pH of the extract to a value between 4 and 7. It is also possible, and frequently desirable, to carry out the method of the present invention, i.e. the decomposition of nucleic acids and the like in the presence of buffer solutions such as phosphate-, phthalate-, acetate-, or tris-(oxymethyl)-aminomethane-buffer.

By operating in this manner, i.e. employing a buffer solution, the reaction time is considerably shortened and the activity of the 5'-phosphodiesterase is substantially maintained while at the same time substantial inactivation of the 5'-nucleotidase will take place. Furthermore, it may be noted at this point, the method of the present invention operates with very small quantities of extraneous materials.

If it is desired to work without the addition of a heavy metal salt, then it is preferred to inactivate the 5'-nucleotidase by adjusting the pH of the extract to between 4 and 7. Furthermore, it has been found that it is not necessary to extract the vegetable material with an aqueous solution which has been adjusted to a certain pH, but the extract may be subsequently adjusted to the desired pH. It is also within the scope of the present invention to carry out the method in the presence of buffer solutions such as phosphate, phthalate-, acetate-, or tris-(oxymethyl)-aminomethane-buffers.

Thus, according to the present invention, plant extracts are produced and the same are then directly used for splitting or decomposing nucleic acids.

The following examples are given as illustrative only, without however, limiting the invention to the specific data of the examples.

EXAMPLE 1

One part by weight of spinach leaves (*spinacia oleracea*) are quick frozen, then thawed and thereafter stirred for two hours with 5 parts by weight of tris-(oxymethyl)-aminoethane-buffer solution having a pH of 7.5, and with a few drops of toluene. After stirring for two hours, the thus formed extract is separated from the spinach leaves and is ready for use, i.e. may be used as is for splitting nucleic acids. The last mentioned buffer solution will be identified hereinbelow for the sake of brevity as "tris-buffer solution."

EXAMPLE 2

One part by weight of carrot roots (*daucus carota*) are comminuted in a homogenizer with addition of toluene, and subsequently mixed with 5 parts by weight of a tris-buffer solution having a pH of between 7.5–8.0. The mixture is then stirred for three hours and thereafter centrifuged. The thus produced extract is ready fo use in the splitting of nucleic acids.

EXAMPLE 3

Potatoes, i.e. the tubers of solanum tuberosum are comminuted for 5 minutes in a homogenizer with addition of toluene and the thus formed pulp or mash is then mixed with 5 times its weight of tris-buffer solution having a pH of 7.5 and additional toluene. After allowing the mixture to stand at room temperature under stirring for five hours, the mixture is centrifuged and the thus separated extract is ready for use for the splitting of nucleic acid.

EXAMPLE 4

Linseed cake (*Linum usitassimum*) is ground for five minutes in a homogenizer and subsequently stirred for two hours with an amount of tris-buffer solution equal to 15 times the weight of the linseed cake. The pH of the tris-buffer solution is 8.0, and stirring is carried out with the addition of 1% of chloroform at room temperature for two hours. The extract is recovered by centrifuging the mixture and the thus separated extract is then used for splitting nucleic acid.

EXAMPLE 5

Hips, i.e. rose bush pseudocarps are comminuted for five minutes in a homogenizer and thereafter diluted with 15 times the weight of the hips of a collidine-buffer solution having a pH of 7.5. A small amount of chloroform is added. Extraction is carried out under stirring for three hours and the extract is then separated by centrifuging the mixture.

The thus formed extract is ready for use.

EXAMPLE 6

De-fatted peanuts (*Arachis hypogaea*) are comminuted in the homogenizer for about three minutes and then taken up with about 15 times their weight of a collidine-buffer solution having a pH of 7.5, and the thus formed mixture to which a small amount of toluene is added is then stirred for three hours at room temperature. After separation of the undissolved portion of the stirred mixture, the remaining extract is used for splitting nucleic acid.

EXAMPLE 7

Wheat germs (*Tritium vulgare*) are comminuted in dry state in a homogenizer and the thus obtained powder is then mixed with 10 times its weight of tris-buffer solution having a pH of 7.5. Toluene is added and the mixture stirred for two hours at room temperature. After centrifuging, the supernatant solution is used for splitting nucleic acid.

EXAMPLE 8

Excellent results with respect to the splitting of nucleic acid into 5'-mononucleotides are achieved by using extracts such as may be produced, for instance, of wheat germs, which were subjected to a further purification. In the last step of the purification process described in the present example, the 5'-phospho-diesterase will be found in nearly pure form:

200 g. of wheat germs are comminuted in a homogenizer and thereafter stirred for two hours with an amount of tris-buffer solution having a pH of 7.5, equal to 6 times the weight of the wheat germs. A small amount of toluene is added prior to stirring. After completion of two hours of stirring, the mixture is separated by centrifuging. The separated supernatant portion is then mixed with 1.5 g. of calcium phosphate-gel, stirred and centrifuged. The thereby formed supernatant portion is separated and mixed with 18.0 g. of calcium phosphate-gel, again stirred and centrifuged. Finally, the now formed supernatant portion is separated and 10 g. of the calcium phosphate-gel are added thereto. After stirring and centrifuging, the sediment formed thereby is eluated with 0.2 saturated ammonium sulfate solution (1.0 means a saturated solution) at a temperature of 0° C. and the gel is separated by centrifuging. The supernatant solution is brought with ammonium sulfate solution to a degree of saturation equal to 0.55, stirred and centrifuged. After separation of the precipitate, ammonium sulfate is added to the solution in such an amount that a degree of saturation of 0.75 is reached. The now formed precipitate is taken up with a small amount of tris-buffer solution having a pH of 7.5. The thus formed solution contains the enzyme, namely the 5'-phospho-diesterase in nearly pure form.

EXAMPLE 9

20 g. barley sprouts are extracted for three hours with 200 cm.³ of tris-buffer solution having a pH of 8.5, and then for 30 minutes centrifuged at between 10,000 and 15,000 times g. The thus separated solution is then dialyzed overnight against tap water and thereafter charged into an exchanger on the basis of dextran with diethyl-aminoethyl-groups, such as is available under the name "Sephadex DEAE, Type A50, coarse" from the firm Pharmacia at Upsala, Sweden, which exchanger previously has been adjusted with 1/100 mol tris-buffer. Eluation of the enzyme is then carried out with an acetate-buffer having a pH of 5.5 using a sodium chloride gradient. The eluated enzyme of the accruing colorless solution is highly active.

EXAMPLES 9–17

For splitting nucleic acid as summarized below, 60 parts by volume or 1.4 parts or 1.0 part by volume of the extracts obtained in accordance with Examples 9–17 are mixed with 10 parts by volume of 5% nucleic acid solution and 30 or 19 parts by volume of 0.1 m. tris-buffer, or collidine-buffer of pH 8.0 with a small addition of toluene or chloroform. In the corresponding blind experiments, the nucleic acid solution is replaced by 10 parts by volume of water. Enzymatic splitting is carried out at 37° C. and the results of Examples 9–17 are summarized in columns 6 and 7 of Table I.

TABLE I

| 1 | 2 | 3 | 4 | 5 | 6 | 7 |
|---|---|---|---|---|---|---|
| | | | | | Nucleic acid | |
| Example | Enzyme solutions, cm.³ | Nucleic acid solution (5%), cm.³ | Buffer Solution pH 7.5, cm.³ | Reaction time, hours | Nucleic acid splitting, percent | Splitting off of P₂O₅ percent |
| 9 | 60 | 10 | 30 | 12 | 95.0 | 10.0 |
| 10 | 60 | 10 | 30 | 18 | 51 | 9.3 |
| 11 | 60 | 10 | 30 | 12 | 70 | 12.5 |
| 12 | 60 | 10 | 30 | 12 | 62.5 | 13.8 |
| 13 | 60 | 10 | 30 | 21 | 20.2 | 9.8 |
| 14 | 60 | 10 | 30 | 21 | 20.8 | 7.9 |
| 15 | 60 | 10 | 30 | 12 | 81 | 42.6 |
| 16 | 1.4 | 10 | 30 | 12 | 90 | 1.0 |
| 17 | 1.0 | 10 (0.2%) | 19 | 10 | 100 | 0.0 |

To determine the result of the splitting, the test mixtures are treated after complete incubation and subsequent cooling with trichloroacetic acid-uranylacetic solution (MacFadyens Reagent), and thereafter filtered in order to remove unconverted nucleic acid. Thereafter, the UV-adsorption is measured in a spectrophotometer against a blind test sample. The P₂O₅ determination is carried out spectrophotometrically in accordance with the method described by M. Rockstein and P. N. Herron, Analyt. Chemistry 23 (1951), 1500.

EXAMPLES 18–22

The following examples will serve to describe the method of the present invention when carried out with heating and cooling of the vegetable extracts.

The plant extract is made of 10 parts by weight of barley sprouts which are introduced in 100 parts by weight of water. After stirring at room temperature for two hours, the mixture is centrifuged. The thus formed extract has a pH value of between 5 and 6 and is adjusted with sodium hydroxide or acetic acid to the desired pH. Thereafter, the extract is heated in a water bath at the temperature and for the time period indicated below. After completion of the heat treatment, the extract is cooled to room temperature and the pH adjusted to 8.0.

The splitting of the nucleic acid is then carried out with 15 parts by weight of the thus obtained barley sprout extract or of an extract obtained from other vegetable material, for instance from de-oiled wheat germs. 15 parts by volume of the thus obtained vegetable extract are then mixed with 10 parts by volume of a solution of the sodium salt of nucleic acid having a concentration of 2% based on nucleic acid, and 12 parts by volume of a 0.1 molar tris-buffer having a pH of 8.0, with an additional small amount of toluene. In the corresponding blind tests, the nucleic acid solution is replaced by 10 parts by weight of water. Enzymatic decomposition or splitting at 37° C. takes about 20 hours. The results obtained with different vegetable materials and under varying pretreatment conditions are shown in columns 6 and 7 of Table II.

The analytic determinations of the results shown in Table II were made in the manner described in connection with Table I.

with 2 parts by volume of a solution of the sodium salt of nucleic acid having a concentration of 1.687% with respect to nucleic acid, 3 parts by volume of 0.1 molar tris-buffer solution having a pH of 8.0 and a small amount of toluene. In the corresponding blind experiments, the nucleic acid salt solution was replaced by 2 parts by volume of water. Enzymatic decomposition or splitting at a temperature of 37° C. takes about 20 hours and the results obtained in this manner will be found in columns 8 and 9 of Table III.

TABLE II

| 1 | 2 | 3 | 4 | 5 | 6 | 7 |
|---|---|---|---|---|---|---|
|   |   | Pretreatment of extract | | | Nucleic acid | |
|   |   | Heating | | | | |
| Example | Vegetable material to be extracted | Temperature, ° C. | Time in minutes | pH value | Nucleic acid splitting, percent | Splitting off of $P_2O_5$, percent |
| 18 | Barley sprouts | 55 | 20 | 4 | 81 | 2.0 |
| 19 | do | 65 | 20 | 5 | 87 | 1.6 |
| 20 | do | 65 | 15 | 6 | 92 | 2.3 |
| 21 | Wheat germs | 65 | 20 | 5 | 78 | 5.3 |
| 22 | do | 65 | 15 | 6 | 84 | 6.1 |

EXAMPLES 23–42

Table III further below illustrates the results obtained with vegetable extracts which were pretreated by heating in the presence of heavy metal salts.

The analytic determinations which are recorded in Table III were carried out in accordance with the methods described in connection with Table I.

TABLE III (A) Experiments with various salts, salt concentrations and pH values

| 1 | 2 | 3 | 4 | 5 | 6 | 7 | 8 | 9 |
|---|---|---|---|---|---|---|---|---|
|   |   | Pretreatment of extract | | | | Nucleic acid | | |
|   |   | Metal salt | | Heating | | | | |
| Example | Vegetable material | Type | Concentration mol | Temperature, ° C. | Time, min. | pH | Nucleic acid splitting, percent | Splitting off of $P_2O_5$, percent |
| 23 | Barley sprouts | $CuCl_2$ | 0.002 | 65 | 20 | 5 | 87 | 11 |
| 24 | do | $CuCl_2$ | 0.0002 | 65 | 20 | 5 | 91 | 4 |
| 25 | do | $NiCl_2$ | 0.001 | 65 | 20 | 5 | 100 | 15 |
| 26 | do | $NiCl_2$ | 0.00025 | 65 | 20 | 5 | 100 | 18 |
| 27 | do | $NiCl_2$ | 0.001 | 65 | 20 | 6 | 100 | 15 |
| 28 | do | $NiCl_2$ | 0.00025 | 65 | 20 | 6 | 100 | 16 |
| 29 | do | $NiCl_2$ | 0.001 | 65 | 20 | 7 | 96 | 15 |
| 30 | do | $NiCl_2$ | 0.00025 | 65 | 20 | 7 | 87 | 8 |
| 31 | do | $ZnCl_2$ | 0.01 | 65 | 20 | 4 | 96 | 10 |
| 32 | do | $ZnCl_2$ | 0.001 | 65 | 20 | 4 | 92 | 3.6 |
| 33 | do | $ZnCl_2$ | 0.01 | 65 | 20 | 6 | 85 | 2.6 |
| 34 | do | $ZnCl_2$ | 0.001 | 65 | 20 | 6 | 79 | 2.7 |
| (B) Experiments at varying temperatures and treatment periods | | | | | | | | |
| 35 | do | $ZnCl_2$ | 0.001 | 55 | 5 | 4 | 92 | 32 |
| 36 | do | $ZnCl_2$ | 0.001 | 55 | 10 | 4 | 97 | 23 |
| 37 | do | $ZnCl_2$ | 0.001 | 55 | 20 | 4 | 87 | 16 |
| 38 | do | $ZnCl_2$ | 0.001 | 55 | 40 | 4 | 69 | 2 |
| 39 | do | $ZnCl_2$ | 0.001 | 55 | 5 | 4 | 85 | 0.5 |
| 40 | do | $ZnCl_2$ | 0.001 | 55 | 10 | 4 | 80 | 0.5 |
| 41 | do | $ZnCl_2$ | 0.001 | 55 | 20 | 4 | 75 | 0.3 |
| 42 | do | $ZnCl_2$ | 0.001 | 55 | 40 | 4 | 59 | 0.1 |

The experiments summarized in Table III were carried out by producing a vegetable extract from 10 parts by weight of barley sprouts and 100 parts by weight of water, whereby at the beginning of the extraction period the mixture was adjusted with sodium hydroxide to a pH of 8.0. The extraction was carried out for 2 hours at room temperature under stirring, and thereafter the extract was separated from solid material by centrifuging. The thus obtained extract was then adjusted with sodium hydroxide or acetic acid to the desired pH value. After thus adjusting the pH, an amount of the heavy metal salt solution was added sufficient to achieve the desired molar concentration of the heavy metal salt in the solution. Subsequent heating was carried out on a water bath at the temperatures and for the periods of time indicated in Table III. After completion of the heat treatment, the extract was cooled to room temperature and the pH of the thus pretreated extract was then again adjusted to 8.0.

Three parts by volume of the barley sprout extract or other vegetable extract, for instance wheat germ extract produced as described further above, were then mixed

EXAMPLE 43

150 g. of wheat germ are introduced into 1000 cm.³ water and stirred for 2 hours at room temperature at a pH of 7.5 which is maintained by adding potassium hydroxide. Thereafter the mixture is separated by centrifuging. The thus separated extract is adjusted with hydrochloric acid to a pH value of 5 and an amount of zinc chloride solution is added so that the molar concentration of the zinc chloride in the extract will be equal to 0.005. The extract is then maintained for 20 minutes at 65° C., cooled, and the pH value of the thus pretreated wheat germ extract is again adjusted to a pH of 5.

25 cm.³ of the wheat germ extract, made as described above, are mixed with 25 cm.³ of a 2% nucleic acid solution produced from fish sperm and containing primarily desoxyribonucleic acid. The pH mixture is adjusted to 7.5 and is maintained at this value by continuous addition of the required amount od liluted potassium hydroxide. Termination of the splitting of the desoxyribonucleic acid is indicated by lack of further change of the pH of the solution, i.e., the pH remains at 7.5 without further addition of dilute potassium hydroxide. The average duration of the reaction at 37° C. is about 27 hours and upon completion thereof it is found that 85% of the nucleic acid have been split while only 6% of the $P_2O_5$ have been split off.

EXAMPLE 44

A germ extract is used which has been produced substantially as described in Example 43 with zinc chloride of 0.001 molar concentration as the metal salt which is added to a barley sprout extract which is then heated to a temperature of 65° C. at a pH of 5.0 and for a period of 20 minutes.

40 cm.³ of the thus pretreated barley sprout extract are then mixed with 10 cm.³ of a 2.5% neutralized desoxyribonucleic acid solution. The mixture is adjusted with sodium hydroxide to a pH value of 8. After 24 hours, during which time the pH value is maintained at 8 by continuous addition of dilute sodium hydroxide and the incubation temperature is maintained at 37° C., it will be found that the nucleic acid has been split to the extent of 75%, while phosphate was split off to an extent of 9.6%.

EXAMPLE 45

50 g. of vacuum dried seed sprouts of soya beans (*Vicia faba*) are finely ground and then extracted with 50 cm.³ of water at a pH of 8 which is adjusted with sodium hydroxide, for a period of 5 hours. The thus obtained extract is then adjusted with hydrochloric acid to a pH of 5 and a copper chloride solution is added in such an amount that the concentration of copper in the mixture will be equal to 0.0002 molar concentration. The mixture is now heated for 20 minutes at 60° C. After cooling, the extract is adjusted with sodium hydroxide to a pH of 8.

50 cm.³ of the thus obtained pretreated extract are mixed with 40 cm.³ of 0.1 molar tris-buffer solution having a pH of 8, with the addition of a small amount of chloroform and of 10 cm.³ of a 2.5% solution of the sodium salt of nucleic acid. The thus formed mixture is then heated to 37° C. and maintained at such temperature for 18 hours. Upon subsequent cooling it is found that the enzymatic splitting of the nucleic acid had been effective to 90% while the splitting off of phosphate amounted to 5.5%.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of obtaining 5'-mononucleotides, comprising the steps of extracting a material of angiospermal origin selected from the group consisting of fruit, plant leaf, tuber, plant root and beet and containing a 5'-phosphodiesterase active agent with an aqueous liquid so as to obtain a substantially solids free aqueous extract containing at least a portion of said 5'-phosphodiesterase active agent of said material; reacting nucleic acid with thus obtained 5'-phophodiesterase active agent-containing extract without further purification of the latter, so as to decompose said nucleic acid with the formation of 5'-mononucleotides; and recovering the thus formed 5'-mononucleotides.

2. A method as defined in claim 1, wherein said aqueous liquid is water.

3. A method as defined in claim 1, wherein said aqueous extract is purified by being subjected to calcium phosphate gel fractionation.

4. A method as defined in claim 1, wherein said aqueous extract is purified by subjecting the same to precipitation with an organic liquid selected from the group consisting of acetone and alcohols; and eluating the precipitate formed thereby.

5. A method as defined in claim 1, wherein said reacting of nucleic acid is carried out in the presence of an organic solvent.

6. A method as defined in claim 1, wherein said material being extracted is fruit.

7. A method as defined in claim 1, wherein said material being extracted is plant leaf.

8. A method as defined in claim 1, wherein said material being extracted is plant root.

9. A method as defined in claim 1, wherein said material being extracted is tuber.

10. A method as defined in claim 1, wherein said material of angiospermal origin is derived from monocotyledones.

11. A method as defined in claim 1, wherein said material of angiospermal origin is derived from di-cotyledones.

12. A method as defined in claim 1, wherein said material of angiospermal origin is derived from leguminous plants.

13. A method as defined in claim 1 and including the step of heating said substantially solids-free aqueous extract for a relatively short period of time to an elevated temperature, thereafter cooling said extract to substantially ambient temperature prior to reacting nucleic acid therewith.

14. A method as defined in claim 13, wherein said heating is carried out for between about 5 and 40 minutes at a temperature between about 45° and 70° C.

15. A method as defined in claim 13, wherein said heating is carried out for a period of between about 15 and 25 minutes at a temperature of between about 55° and 65° C.

16. A method as defined in claim 1, wherein said extract, prior to reacting nucleic acid therewith, is heated to an elevated temperature for a relatively short period of time in the presence of a heavy metal salt and thereafter cooled to substantially ambient temperature.

17. A method as defined in claim 16, wherein said extract is heated for between about 15 and 25 minutes in the presence of a heavy metal salt selected from the group consisting of the chlorides, sulfates and nitrates of zinc, nickel and copper at a temperature of between about 55° and 65° C.

18. A method as defined in claim 17, wherein said heavy metal salt is present in a molar concentration of between $10^{-2}$ and $10^{-5}$.

19. A method as defined in claim 1, wherein said material is selected from the group consisting of spinach leaf, carrot root, potato, and hip.

References Cited

UNITED STATES PATENTS

| | | |
|---|---|---|
| 3,104,171 | 9/1963 | Sakaguchi et al. |
| 3,163,586 | 12/1964 | Ishida et al. |
| 3,168,446 | 2/1965 | Omura et al. |

OTHER REFERENCES

Dixon et al.: Enzymes, Academic Press Inc. Pub., New York, pp. 51 and 52 (1958).

Kuninaka et al.: Agr. Biol. Chem., vol. 25, No. 9, pp. 693–701, 1961.

Shuster et al.: Biochimica Et Biophysica Acta( vol. 33, pp. 452–461, 1959.

Colowick et al.: Methods in Enzymology, vol. I, pp. 728–731 and 767, 1957.

Shuster: Journal of Biological Chemistry, vol. 229, November–December 1957, pp. 289–300.

ALVIN E. TANENHOLTZ, Primary Examiner

U.S. Cl. X.R.

195—63, 66